UNITED STATES PATENT OFFICE.

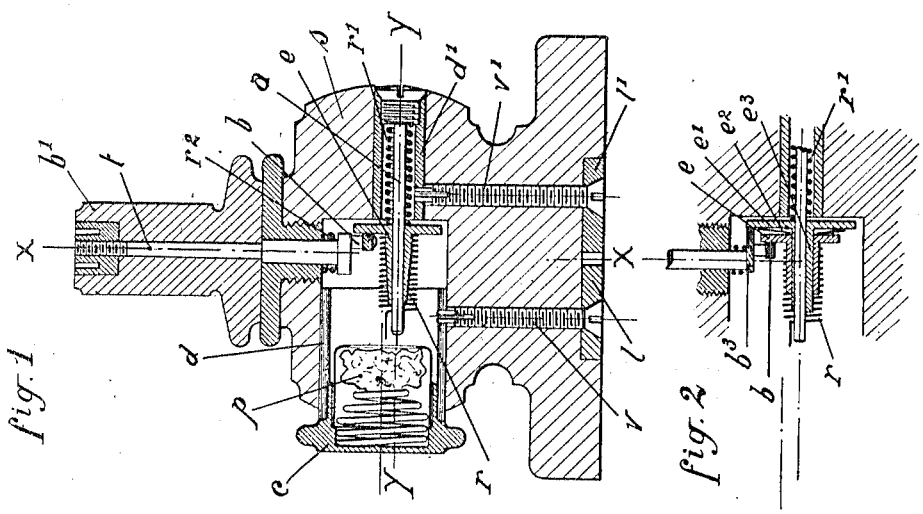

ANTOINE BONNEFONT, OF PARIS, FRANCE.

CRYSTAL DETECTOR FOR WIRELESS TELEGRAPHY.

1,410,793.  Specification of Letters Patent.  Patented Mar. 28, 1922.

Application filed November 9, 1920. Serial No. 422,804.

*To all whom it may concern:*

Be it known that I, ANTOINE BONNEFONT, a citizen of the Republic of France, residing at 71 Rue Vandamme, Paris, Seine, France, have invented certain new and useful improvements in Crystal Detectors for Wireless Telegraphy; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

Crystal detectors are used in wireless telegraphy in which the most commonly employed device for locating the sensitive points comprises a pivoted arm ending in a coiled spring which terminates in a point. This arm is operated by hand, and the entire device is necessarily open and exposed to dust, whence will follow the rapid deterioration of the crystals. On the other hand, the pressure of the spring is not adjustable, although this feature is specially desirable for adjusting the points to the greatest sensitiveness.

This invention comprises a mechanical device for locating the sensitive points whereby the crystal and the exploring point may be enclosed while at the same time permitting the proper exploration of the crystal to be carried out as well as the adjustment of the point in order to obtain the best effect of sound. These adjustments are effected by rotating a suitable head which is operated from the outside.

The accompanying drawing which is given by way of example shows an embodiment of this invention.

Fig. 1 is a section of the complete device.

Fig. 2 is a modified form of the exploring mechanism.

The device comprises a base $s$ in insulating material of any suitable kind having disposed thereon a suitable metal cap $c$ containing the detector substance $p$; said cap is rotatable by hand by rather hard friction in a metal sleeve $d$ secured to said base by a metal screw $v$ which serves at the same time to secure in place the current contact plate $l$; upon said base is also mounted a shaft $a$ having slidable thereon a flanged sleeve $e$ carrying an exploring spring $r$ ending in a point which comes near said shaft $a$, this being carried out to prevent the coils of the spring from vibrating under slight shocks.

A spring $r^1$ presses said flanged sleeve towards the cap $c$. A metal socket $d^1$ has disposed therein said shaft $a$ and a screw $v^1$ secures in place the second current contact plate $l^1$. The exploring device is operated by a rod $t$ provided with a stud $b$ milled at the end thereof and disposed in eccentric position with reference to the rod $t$; said rod carries at the outer part an operating head $b^1$, a spring $r^2$ maintains the rod $t$ in the lower position and provides a suitable braking action for the maneuvering of the device.

The device is operated in the following manner. Upon rotating the outer head, the eccentric stud $b$ describes a circumference about the axis X—X, and the flanged sleeve $e$ which is held pressed against the milled part of the stud will follow all the movements of the latter.

1. The stud effects a reciprocating movement from the end position shown in the drawing to the opposite position which coincides approximately with the axis X—X.

2. With this reciprocating movement is combined a second movement consisting in a rotary motion about the axis Y—Y produced by the actuating effect of the eccentric milled stud which acts as a friction roller. This movement is variable, being null when the flange coincides with the axis X—X and a maximum when in the position shown in the drawing.

The exploring member $r$ is thus caused according to these various motions to move forward or backward, and then at substantially the end of each backward stroke it rotates in order to return to its position in contact with the crystal but at another point on the latter and at this moment without rotation. It will thus be observed that in order to adjust the pressure at any point, it will suffice to rotate the regulating head in either direction.

When rotating about the shaft $a$, the exploring point makes contact with the crystal at the points located on a circumference having Y—Y as a center. To explore other points on the crystal it will suffice to rotate the cap $c$ by hand, inasmuch as it is the eccentric position with reference to the axis Y—Y.

A modified form of the device is shown in Fig. 2, and it comprises two milled rollers $b$ and $b^3$ concentric or not. Against these two rollers bear the flanged portions $e$ and $e^1$ spaced apart by an elastic metal washer $e^2$; the flanged portion $e^1$ carries a sleeve $e^3$ provided with an eccentric aperture. The exploring member $r$ is mounted on the flanged sleeve $e$; the spring $r^1$ presses the entire device against the milled rollers. When operated, said sleeves move forward and backward together, but the device produces a relative movement of rotation of one of said members with reference to the other by reason of the actuating movement of the milled rollers $b$ and $b^3$ which have different diameters.

Having thus described the nature of my said invention and the best means I know of carrying the same into practical effect, what I claim is—

1. A crystal detector for wireless telegraphy, comprising an insulating base, a crystal disposed within said base and out of contact with the exterior atmosphere, a supporting member for said crystal rotatable about the axis thereof, a contact point disposed opposite said crystal in the interior of said base, a spiral spring, a sliding sleeve constituting a support for the spiral spring whose end constitutes the exploring point, a rod along which said sliding sleeve is adapted to slide, said rod being secured to said base and eccentrically disposed with reference to the axis of the crystal, and exterior actuating means for effecting the forward or backward motion of said sleeve and for effecting the angular rotation thereof.

2. A crystal detector for wireless telegraphy, comprising an insulating base, a crystal disposed within said base and out of contact with the exterior atmosphere, a supporting member for said crystal rotatable about the axis thereof, a contact point disposed opposite said crystal in the interior of said base, a spiral spring, a sliding sleeve constituting a support for the spiral spring whoes end constitutes the exploring point, a rod along which said sliding sleeve is adapted to slide, said rod being secured to said base and eccentrically disposed with reference to the axis of the crystal, an exterior actuating head, a shaft in the latter, an eccentric roller mounted on the shaft, and a disk secured to said sliding sleeve and contacting with said eccentric roller, the combination represented by said eccentric roller and said plate being caused to operate at certain times as a friction actuating device.

In testimony that I claim the foregoing as my invention, I have signed my name.

ANTOINE BONNEFONT.